United States Patent

Hassan et al.

Patent Number: 6,092,990
Date of Patent: Jul. 25, 2000

[54] OSCILLATING AIR JETS FOR HELICOPTER ROTOR AERODYNAMIC CONTROL AND BVI NOISE REDUCTION

[75] Inventors: Ahmed A. Hassan; Friedrich K. Straub, both of Mesa; David B. Domzalski, Gilbert, all of Ariz.

[73] Assignee: McDonnell Douglas Helicopter Company, Mesa, Ariz.

[21] Appl. No.: 08/869,725

[22] Filed: Jun. 5, 1997

[51] Int. Cl.$^7$ .................................................. B64C 27/04
[52] U.S. Cl. ........................... 416/42; 416/3; 416/90 A; 416/91; 416/500; 415/119; 244/199; 244/203; 244/204; 244/130
[58] Field of Search ................................ 416/3, 23, 24, 416/90 R, 90 A, 91, 42, 20 R, 155, 500; 415/119, 914; 381/173, 190; 244/198, 199, 203, 204, 207, 208, 130, 195, 76 C

[56] References Cited

U.S. PATENT DOCUMENTS

| | | |
|---|---|---|
| 2,071,012 | 2/1937 | Adams . |
| 2,397,132 | 3/1946 | Dent, Jr. . |
| 2,892,502 | 6/1959 | Donovan . |
| 3,451,644 | 6/1969 | Marchetti et al. . |
| 3,509,971 | 5/1970 | Gerstine et al. . |
| 3,588,273 | 6/1971 | Kizilos et al. ............................. 416/42 |
| 3,954,229 | 5/1976 | Wilson . |
| 4,514,143 | 4/1985 | Campbell . |
| 4,516,747 | 5/1985 | Lurz ........................................ 244/130 |
| 4,580,210 | 4/1986 | Nordstrom . |
| 4,706,902 | 11/1987 | Destuynder et al. . |
| 4,802,642 | 2/1989 | Mangiarotty ............................ 244/130 |
| 4,989,810 | 2/1991 | Meier et al. ............................. 244/208 |
| 5,320,491 | 6/1994 | Coleman et al. . |
| 5,457,630 | 10/1995 | Palmer ...................................... 244/203 |
| 5,529,458 | 6/1996 | Humpherson ............................ 416/90 R |
| 5,588,800 | 12/1996 | Charles et al. . |
| 5,791,601 | 8/1998 | Dancila et al. ........................... 416/24 |

FOREIGN PATENT DOCUMENTS

| | | | |
|---|---|---|---|
| 1761973 | 9/1992 | U.S.S.R. | ............... 416/90 R |

*Primary Examiner*—Christopher Verdier
*Attorney, Agent, or Firm*—Stout, Luxa, Buyan & Mulling, LLP; Donald E. Stout

[57] ABSTRACT

An active control system for reducing blade-vortex-interaction (BVI) noise generated by a rotor blade. The active control system includes a pressure sensor assembly, a device for changing a lift generated by the rotor blade, and a controller for activating the device upon a detected change in air pressure by the sensor assembly. The sensor assembly is disposed in close proximity to the rotor blade, and is adapted to detect a change in air pressure on a surface of the rotor blade near a leading edge of the rotor blade. The device is adapted to be activated by the controller, to thereby change a lift of the rotor blade. The controller activates the device to change a lift of the rotor blade in order to introduce a compensating pressure onto the surface of the rotor blade. This compensating pressure attenuates the magnitude of the change of air pressure. The device for changing a lift generated by the rotor blade can include at least one aperture on the rotor blade and a diaphragm in the interior of the rotor blade. The diaphragm can be activated and moved between a first position and a second position at a frequency. Movement of the diaphragm from the first position to the second position pushes air out of the at least one aperture, and movement of the diaphragm from the second position to the first position draws air into the at least one aperture.

31 Claims, 8 Drawing Sheets

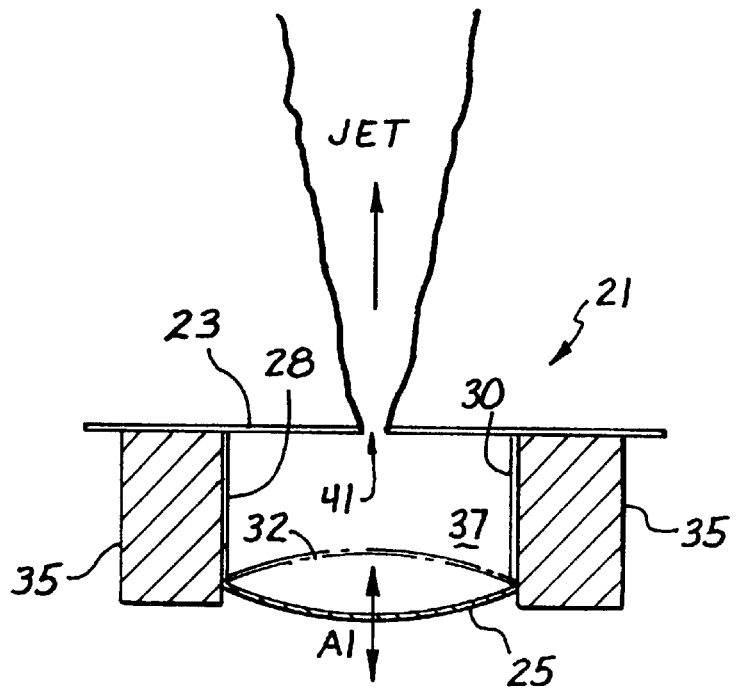
Fig. 1
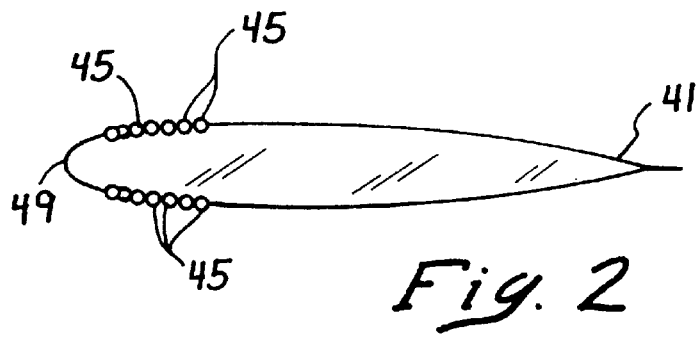
Fig. 2
Fig. 3
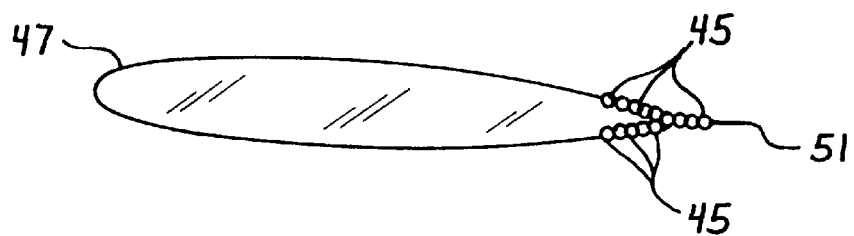

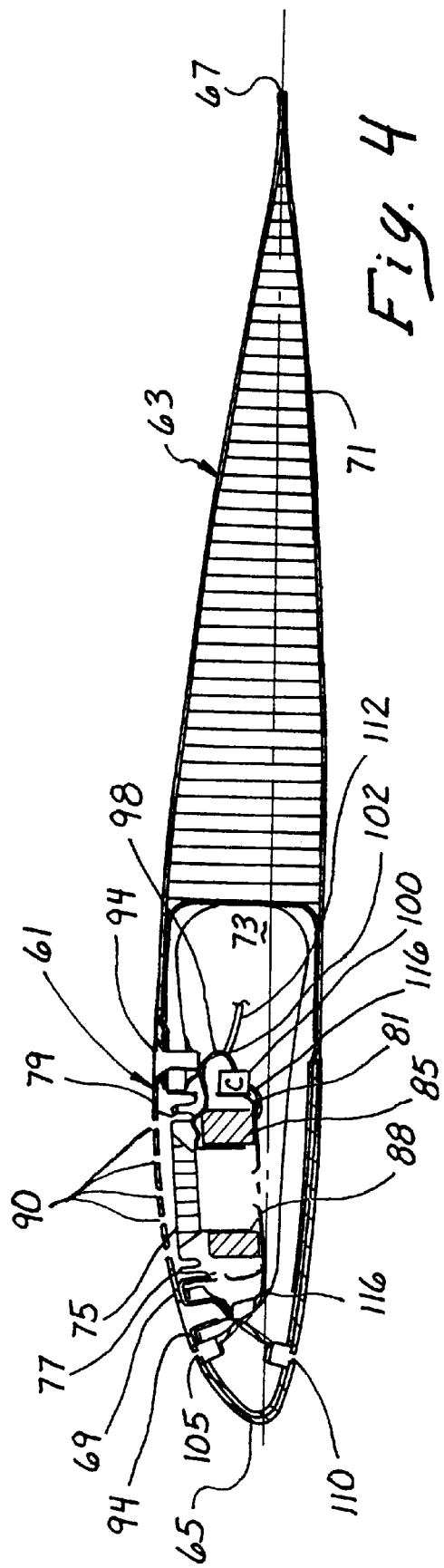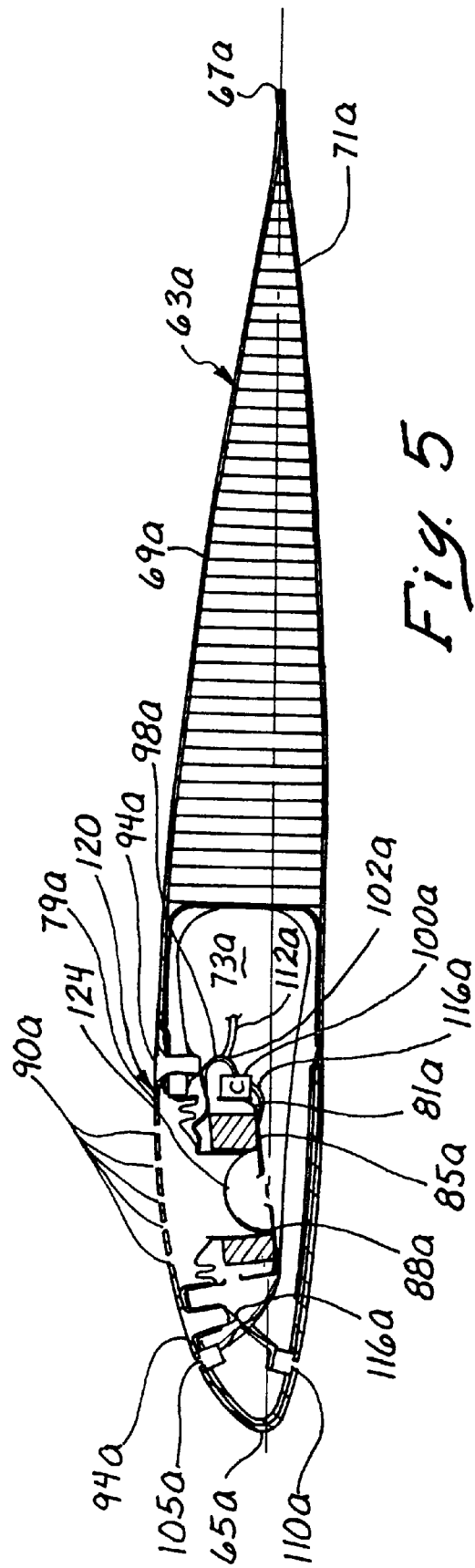

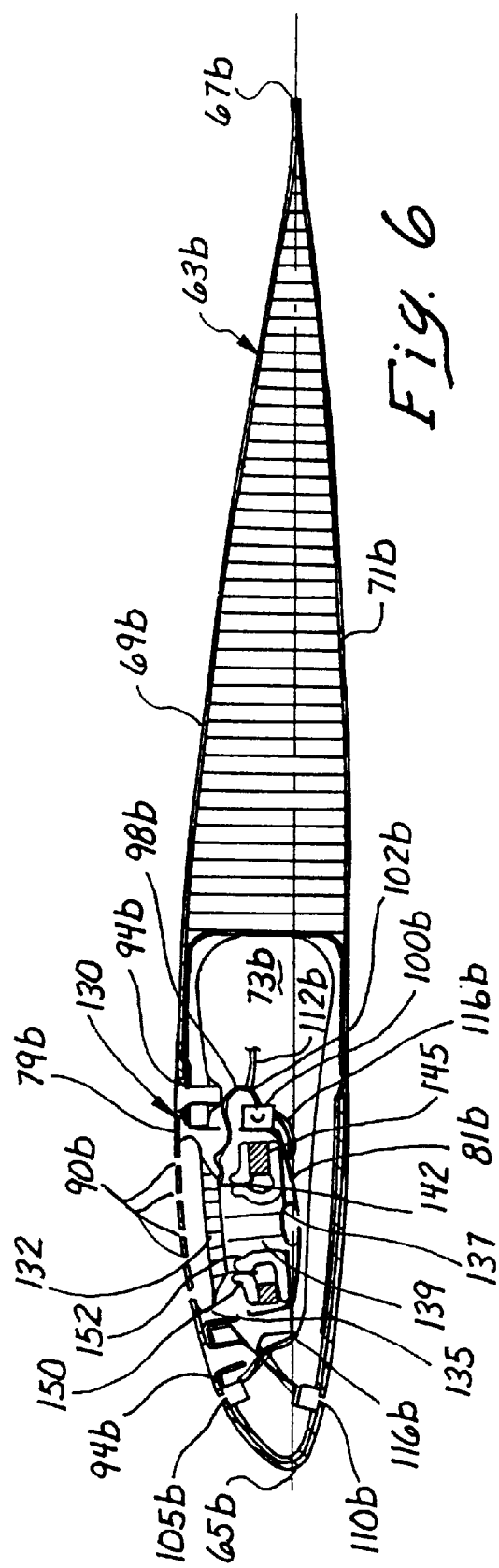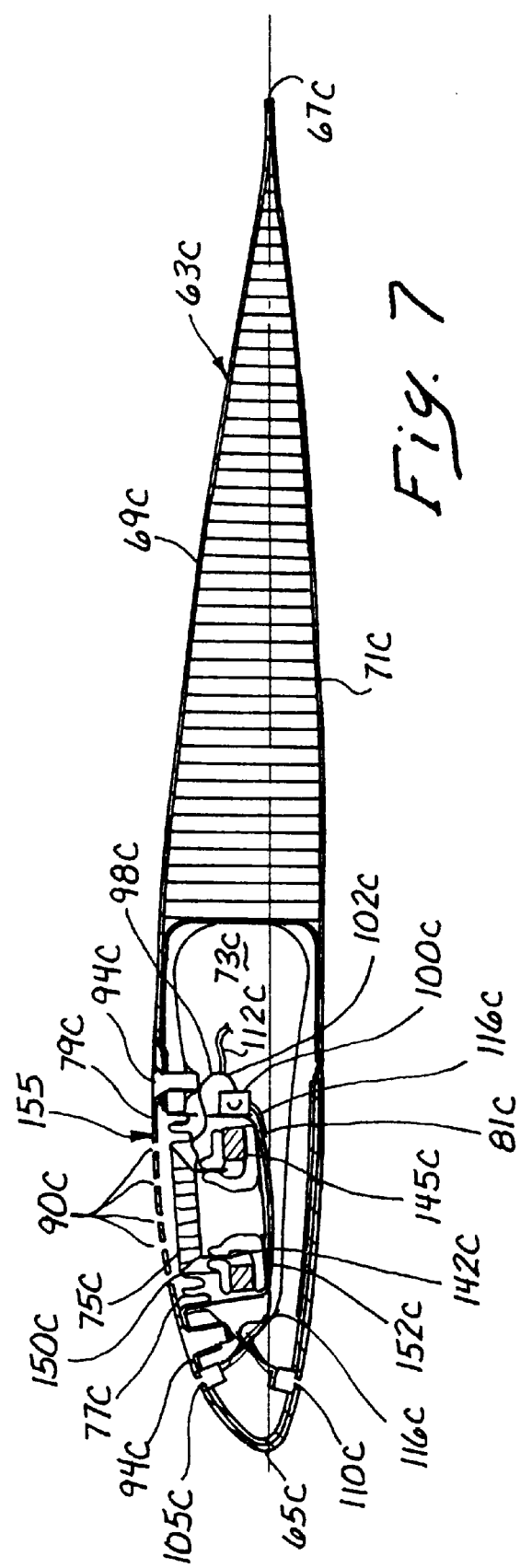

OSCILLATING AIR JETS FOR HELICOPTER ROTOR AERODYNAMIC CONTROL AND BVI NOISE REDUCTION

This application is related to U.S. application Ser. No. 08/251,329, filed on May 31, 1994 and entitled BLADE VORTEX INTERACTION NOISE REDUCTION TECHNIQUES FOR A ROTORCRAFT, which issued into U.S. Pat. No. 5,588,800; co-pending U.S. application Ser. No. 08/727,980, filed on Oct. 9, 1996 and entitled ACTIVE BLOWING SYSTEM FOR ROTORCRAFT BLADE VORTEX INTERACTION NOISE REDUCTION; which issued into U.S. Pat. No. 5,813,625 and co-pending U.S. application Ser. No. 08/869,372, filed on Jun. 5, 1997 and entitled OSCILLATING AIR JETS ON AERODYNAMIC SURFACES; all of which are commonly assigned and the contents of which are expressly incorporated herein by reference.

BACKGROUND OF THE INVENTION

1. Field of the Invention

This invention relates generally to aerodynamic surfaces and, more particularly, to improved constructions and control schemes for such aerodynamic surfaces which provide for aerodynamic control and for significant reductions in noise in the case of rotor blades.

2. Description of Related Art

Conventional helicopters in descent flight conditions frequently generate an impulsive noise signature which is commonly referred to as blade-vortex interactions (BVI) noise or "blade slap." BVI noise is generated by blade tip vortices, which interact with the rotor blades. Unfortunately, it is typically within a frequency range which is highly important to human subjective response. Additionally, it is easily detected electronically at large distances, thus increasing the vulnerability of military rotorcraft. Consequently, a reduction in the BVI noise intensity and changes in the noise signature, using active and/or passive noise control techniques, is desirable to the rotorcraft industry, which is challenged by today's stringent military and civilian acoustic regulations.

There are three possible measures which may be taken to reduce BVI noise. Namely, the tip vortex strength may be weakened, the separation distance between the blade and the tip vortex may be increased, and/or the blade geometry may be altered. The result of these measures is a decrease in the strength of the interaction between the rotor blade and the tip vortices. Existing devices which have been used for reducing BVI noise include the use of a blade-mounted trailing edge flap which seeks to change the strength of the tip vortex and hence the intensity of BVI and the use of Higher Harmonic root pitch control (HHC), which seeks to change the blade/vortex distance, and thus the local aerodynamic conditions, through blade pitch changes.

Other control means concentrate primarily on reducing the strength of the tip vortex through blade tip geometric modifications. Typical examples are the use of leading and trailing edge sweep, the use of blade anhedral, spoilers, and the use of a subwing concept. All of these examples, excluding HHC, may be classified as passive control techniques. An example of another active control technique would be the use of tip air mass injection, which again has the purpose of weakening the blade tip vortices. Tip air mass injection involves introducing a high energy air jet at the tip of the blade, aimed at the center or core of the tip vortex with the sole purpose of diffusing or weakening its strength.

Each of the prior art solutions to BVI noise has been at least partially unsuccessful, either because of ineffectiveness or because of the solution's detrimental side effects with respect to the flight characteristics and efficiency of the rotorcraft. For example, HHC methods change the aerodynamic conditions along the entire blade in order to reduce BVI noise, due to the change in blade pitch. Passive BVI noise control methods are not adaptable to changing BVI conditions throughout the flight regime, which are associated with changes in descent rate and forward flight speed. Additionally, most of the passive prior art solutions to the BVI problem are deployed at all times, whether or not needed, often degrading flight performance unnecessarily.

In addition to problems associated with reducing BVI noise generated by rotor blades, a more general problem exists with providing controllable aerodynamic surfaces on rotor blades, wings, engine inlets, and nozzles. Movable control surfaces placed on these aerodynamic surfaces have included flaps, slats, spoilers, ailerons, elevators, and rudders. Although these control surfaces can mechanically alter the geometry of the original aerodynamic device, they are limited in ability to respond quickly and efficiently. Prior art mechanical control surfaces can add mechanical complexity to the aircraft, can compromise structural integrity, can complicate manufacturing, and can compromise radar detectability.

A synthetic jet includes a movable diaphragm positioned within a chamber. Movement of the diaphragm pulses air in and out of the chamber through an orifice. Prior art synthetic jets typically incorporate a piezoelectric diaphragm, which favors oscillation frequencies between 1 kHz and 14 kHz. These piezoelectric-based synthetic jets consequently have relatively low displacement and energy output capabilities. Piezoelectric devices are typically used in the loud speaker industry for high-frequency sounds where the energy level is relatively low. Although synthetic jets have been used in the prior art for mixing two streams of air, synthetic jets have not, to Applicants' knowledge, been incorporated on aerodynamic surfaces for providing aerodynamic control and/or reducing BVI noise.

SUMMARY OF THE INVENTION

This invention addresses the aforementioned problems by providing a BVI noise reduction device which has a number of advantages over prior art solutions. The invention, a porous surface on the rotor blade driven with positive and negative pressures, is designed to be used as an active control device which alleviates the aerodynamics of the interactions and thus the impulsive BVI noise levels and signature. The porous surfaces can be driven with positive and/or negative pressures either continuously or when predetermined flight conditions are present. The porous surface can be used on the aerodynamic surfaces of rotor blades and on other aerodynamic surfaces, such as wings, engine inlets, and nozzles.

According to one aspect of the present invention, an active control system for reducing blade-vortex-interaction (BVI) noise generated by a rotor blade is disclosed. The active control system includes a sensor assembly for sensing pressure, a device for changing a lift generated by the rotor blade, and a controller for activating the device upon a detected change in air pressure by the sensor assembly. The sensor assembly is disposed in close proximity to the rotor blade, and is adapted to detect a change in air pressure on a surface of the rotor blade near a leading edge of the rotor blade. The device is adapted to be activated by the controller, to thereby change a lift of the rotor blade. The device is adapted to change the lift of the rotor blade even while the rotor blade is maintained at a constant rotational velocity.

The controller is adapted to activate the device to change a lift of the rotor blade in order to introduce a compensating pressure onto the surface of the rotor blade. This compensating pressure attenuates the magnitude of the change of air pressure.

The device for changing a lift generated by the rotor blade can include at least one aperture on the rotor blade and a diaphragm in the interior of the rotor blade. The diaphragm can be activated and moved between a first position and a second position at a frequency. Movement of the diaphragm from the first position to the second position pushes air out of the at least one aperture, and movement of the diaphragm from the second position to the first position draws air into the at least one aperture.

In one embodiment, the sensor assembly is disposed on the rotor blade near the leading edge, and comprises both a lower sensor and an upper sensor. The lower sensor is disposed on the lower surface of the rotor blade near the leading edge of the rotor blade, and the upper sensor is disposed on the upper surface of the rotor blade near the leading edge of the rotor blade.

The controller activates the device to reduce an air pressure on the lower surface of the rotor blade, upon a determination that the air pressure on the lower surface of rotor blade in a vicinity of the leading edge has increased. Similarly, the controller activates the device to increase an air pressure on the lower surface of the rotor blade, upon a determination that the air pressure on the lower surface of the rotor blade in a vicinity of the leading edge has decreased. In an embodiment where the at least one aperture is disposed on the upper surface of the rotor blade, the controller can activate the device to push air out of and draw air into the at least one aperture to thereby decrease a pressure on the lower surface of the rotor blade. In an embodiment where the at least one aperture is disposed on the lower surface of the rotor blade, the controller activates the device to push air out of and draw air into the at least one aperture to thereby increase a pressure on the lower surface of the rotor blade.

According to another aspect of the present invention, a method is disclosed for changing an amount of lift generated by a rotor blade. The method includes a step of providing at least one aperture on an aerodynamic surface of the rotor blade, and includes another step of providing a diaphragm in an interior volume of the rotor blade. The diaphragm is movable between a first position and a second position, whereby movement of the diaphragm from the first position to the second position pushes air out of the at least one aperture. Similarly, movement of the diaphragm from the second position to the first position draws air into the at least one aperture. The method includes a further step of moving the diaphragm between the first position and the second position to thereby change an amount of lift generated by the rotor blade. The step of providing at least one aperture can include a step of providing at least one aperture on the lower surface of the rotor blade, and the step of moving the diaphragm can comprise a step of moving the diaphragm between the first position and the second position to thereby increase an amount of lift generated by the rotor blade.

According to one aspect of the present invention, the step of moving the diaphragm is preceded by a step of receiving into a controller an instruction to increase an amount of lift generated by the rotor blade. The instruction may alternatively comprise an instruction to generate a negative pitching moment (nose down) on the rotorcraft.

The step of providing at least one aperture can comprise a step of providing at least one aperture on the upper surface of the rotor blade, and the step of moving the diaphragm can comprise a step of moving the diaphragm between the first position and the second position to thereby decrease an amount of lift generated by the rotor blade. Similarly, the step of moving the diaphragm to decrease an amount of lift can be preceded by an instruction to either decrease an amount of lift or to generate a positive pitching moment (nose up) on the rotorcraft.

According to another aspect of the present invention, the step of moving the diaphragm comprises a step of moving the diaphragm between the first position and the second position at a predetermined frequency to thereby effect an amount of lift generated by the rotor blade. The method can further comprise a step of changing the predetermined frequency, to thereby change an amount of lift generated by the rotor blade. The step of changing the predetermined frequency can be preceded by a step of receiving into a controller an instruction to either change an amount of lift generated by the rotor blade or to change a pitching moment generated by the rotor blade.

When the at least one aperture is disposed on an upper surface of the rotor blade, the step of moving the diaphragm affects a decrease in the amount of lift generated by the rotor blade. When the predetermined frequency is decreased, a further decrease in the amount of lift generated by the rotor blade results. The predetermined frequency can subsequently be increased to thereby effectively increase an amount of lift generated by the rotor blade.

If the at least one aperture is disposed on the lower surface of the rotor blade and the diaphragm is moved at the predetermined frequency, an amount of lift generated by the rotor blade is increased. If the predetermined frequency is subsequently decreased, the amount of lift generated by the rotor blade is increased.

According to another aspect of the present invention, a method of changing an amount of lift generated by a rotor blade by changing an energization level of a diaphragm is disclosed. The method includes a step of providing at least one aperture on the rotor blade, and includes another step of providing a diaphragm in an interior volume of the rotor blade. The diaphragm is movable in a first direction and a second direction. Movement of the diaphragm in the second direction pushes air out of the at least one aperture, and movement of the diaphragm in the first direction draws air into the at least one aperture. The method includes another step of moving a diaphragm in both the first direction and the second direction at a predetermined energization level. The predetermined energization level corresponds to a predetermined range of motion of the diaphragm in the first and second directions, and further corresponds to a speed of movement of the diaphragm in the first and second directions.

Movement of the diaphragm at the predetermined energization level results in air being pushed out of and drawn into the at least one aperture at a peak of velocity. Movement of the diaphragm at the predetermined energization level affects an amount of lift generated by the rotor blade. The method includes a step of changing the predetermined energization level, to thereby change at least one of the range of motion and the speed of movement of the diaphragm. The changing of the predetermined energization level changes an amount of lift generated by the rotor blade.

The step of changing the predetermined energization level can be preceded by a step of receiving into a controller an instruction to change either an amount of lift generated by the rotor blade or a pitching moment of the rotor blade.

When at least one aperture is disposed on the upper surface of the rotor blade, movement of the diaphragm at the predetermined energization level results in a decrease in the amount of lift generated by the rotor blade. A subsequent decrease in the predetermined energization level results in an effective increase in the amount of lift generated by the rotor blade. A subsequent increase in the predetermined energization level results in an effective decrease in the amount of lift generated by the rotor blade.

When the at least one aperture is disposed on the lower surface of the rotor blade, movement of the diaphragm at the predetermined energization level results in an increase in the amount of lift generated by the rotor blade. When the predetermined energization level is subsequently increased, a resulting increase in the amount of lift generated by the rotor blade is achieved.

One method of the present invention includes a first step of providing a sensor assembly in close proximity to a rotor blade, another step of providing on the rotor blade a device for changing a lift generated by the rotor blade, another step of determining with the sensor assembly a change in pressure on the rotor blade near the leading edge of the rotor blade, and a final step of activating the device to change a lift of the rotor blade. The device can be activated to change a lift of the rotor blade, even while the rotor blade is maintained at a constant rotational velocity. The device is activated in order to introduce a compensating pressure onto the rotor blade. This compensating pressure attenuates a magnitude of the already existing blade pressure.

The determining step can comprise a first step of inputting a lower sensed pressure from a lower sensor, a second step of inputting an upper sensed pressure from an upper sensor, and a step of comparing the lower sensed pressure with the upper sensed pressure to thereby generate a sensed differential pressure. The sensed differential pressure represents a difference between the lower sensed pressure and the upper sensed pressure. The determining step further includes a step of comparing the sensed differential pressure with a stored value of differential pressure, and a step of generating a change in pressure. The generated change in pressure represents a difference between the sensed differential pressure and the stored differential pressure. The stored value of differential pressure is stored in a predetermined memory location, and the determining step includes a step of storing the sensed differential pressure into the predetermined memory location. The device for changing a lift generated by the rotor blade can comprise at least one aperture on the rotor blade and a diaphragm in the interior of the rotor blade. The diaphragm is adapted to move between a first position and a second position to thereby push air out of and draw air into the at least one aperture.

The determining step can include a step of determining that a pressure on a lower surface of the rotor blade in a vicinity of the leading edge has increased, in which case the step of activating the device includes a step of activating the device to reduce a pressure on the lower surface of the rotor blade. Similarly, the determining step can comprise a step of determining that a pressure on the lower surface of the rotor blade in a vicinity of the leading edge has decreased, in which case the step of activating the device comprises a step of activating the device to increase a pressure on the lower surface of the rotor blade.

The present invention, together with additional features and advantages thereof, may best be understood by reference to the following description taken in connection with the accompanying illustrative drawings.

BRIEF DESCRIPTION OF THE DRAWINGS

FIG. 1 is a cross-sectional view of a generic oscillating air jet assembly comprising a piezoelectric membrane in accordance with the present invention;

FIG. 2 is a schematic cross-sectional view of a rotor blade having a plurality of oscillating air jet assemblies near a leading edge thereof;

FIG. 3 is a schematic cross-sectional view of a rotor blade having a plurality of oscillating air jet assemblies near a trailing edge thereof;

FIG. 4 is a cross-sectional view of a rotor blade having an oscillating air jet assembly disposed therein in accordance with a first embodiment of the present invention;

FIG. 5 is a cross-sectional view of a rotor blade having an oscillating air jet assembly disposed therein in accordance with a second embodiment of the present invention;

FIG. 6 is a cross-sectional view of a rotor blade having an oscillating air jet assembly disposed therein in accordance with a third embodiment of the present invention;

FIG. 7 is a cross-sectional view of a rotor blade having an oscillating air jet assembly disposed therein in accordance with a fourth embodiment of the present invention.

DETAILED DESCRIPTION OF THE PRESENTLY PREFERRED EMBODIMENTS

Figure 8:
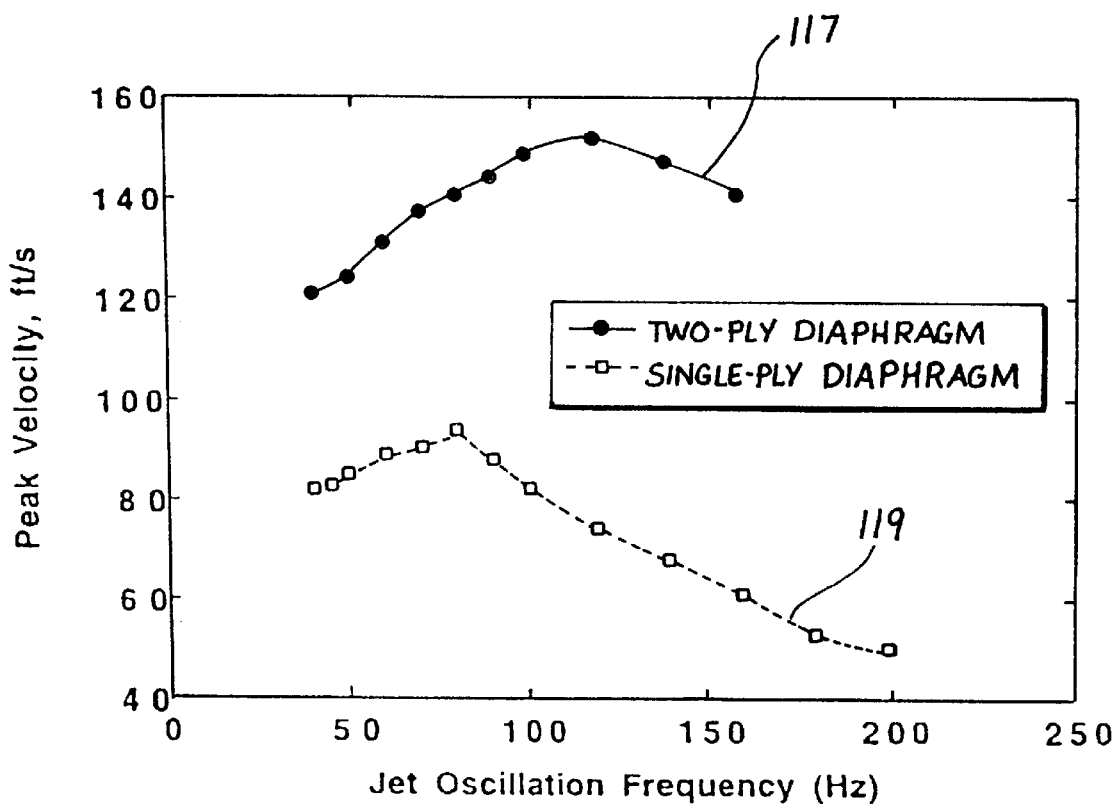
FIGS. 8–16 illustrate results obtained from computational fluid dynamics simulations of air flow past rotor blades incorporating various oscillating air jet assemblies in accordance with the present invention.

Referring now more particularly to the drawings, FIG. 1 illustrates an oscillating air jet assembly 21 which is disposed on an aerodynamic surface 23. The oscillating air jet assembly 21 comprises a diaphragm 25 formed of a piezoelectric material or any other non-permeable material. The diaphragm 25 is preferably supported between a first conductor 28 and a second conductor 30, and is movable in the directions of the arrows A1 between a first position indicated by the reference numeral 25 and a second position indicated by the phantom lines 32.

A chassis 35 secures the first conductor 28 and the second conductor 30 to the aerodynamic surface 23. An oscillating current can be provided to the diaphragm 25 via the first conductor 28 and the second conductor 30, to thereby electrically stimulate the diaphragm 25 to oscillate in directions of the arrows A1.

Movement of the diaphragm from a first position to a position 32 shown in phantom produces a positive pressure within the sealed chamber 37, and movement of the diaphragm in the opposite direction produces a negative pressure in the sealed chamber 37. An aperture 41 is formed in the aerodynamic surface 23 to facilitate movement of air out of and into the sealed chamber 37, in response to the positive and negative pressures generated within the sealed chamber 37 by the diaphragm 25.

When the diaphragm 25 moves in a direction toward the aerodynamic surface 23 a positive pressure is produced within the sealed chamber 37, resulting in a flow of air out of the aperture 41. Similarly, when the diaphragm 25 moves away from the aerodynamic surface 23 a negative pressure within the sealed chamber 37 is established and, consequently, air is drawn into the sealed chamber 37 through the aperture 41.

The resulting oscillation of air into and out of the sealed chamber 37 through the aperture 41, as a result of the oscillating diaphragm 25, is referred to as a zero-mass jet or, alternatively, as an oscillating air jet assembly. The zero-mass jet of FIG. 1 preferably comprises a net mass of air flow into and out of the aperture 41 which is equal to zero during one complete cycle of oscillation of the diaphragm 25.

With reference to FIGS. 2 and 3, arrays of oscillating air jet assemblies 45 can be placed on a rotor blade 47 in a variety of different locations. The cross-sectional view of FIG. 2 illustrates a plurality of oscillating air jet assemblies 45 disposed on an upper surface of the rotor blade near a leading edge 49. An additional array of oscillating air jet assemblies 45 is disposed on a bottom surface of the rotor blade 47 near the leading edge 49.

FIG. 3 illustrates an array of oscillating air jet assemblies 45 disposed on an upper surface of the rotor blade 47 near a trailing edge 51 of the rotor blade 47, and further illustrates an array of oscillating air jet assemblies 45 on a bottom surface near the trailing edge 51 of the rotor blade 47. The oscillating air jet assemblies 45 of FIG. 2 may be disposed on only one, or both, of the two surfaces of the rotor blade 47 in alternative embodiments. Similarly, either or both of the arrays of oscillating air jet assemblies 45 may be disposed near the trailing edge 51 of the rotor blade 47.

Placement of the oscillating air jet assemblies 45 on either the upper, the lower, or both surfaces of the rotor blade 47 results in substantial changes to the original aerodynamic characteristics of the rotor blade 47. Similar effects are achieved by placing the oscillating air jet assemblies 45 on other aerodynamic surfaces, such as wings, engine inlets, and nozzles, for example. In the illustrated embodiment of FIG. 2, the oscillating air jet assemblies 45 are centered about the 15 percent rotor blade chord position. In the embodiment of FIG. 3, the oscillating air jet assemblies 45 are placed near the trailing edge 51 of the rotor blade 47 to emulate aerodynamic effects resulting from use of a mechanical integral-type flap.

The oscillating air jet assemblies 45 may comprise oscillating diaphragms, such as disclosed in FIG. 1 or, alternatively, may comprise other means, such as, for example, electromagnetic for generating an oscillating air jet, such as disclosed in FIGS. 4–7, for example. The oscillating air jet assemblies of the present invention are primarily adapted for targeting local blade aerodynamics (blade geometry) rather than the vortex strength or the blade-vortex separation distance, for alleviation of helicopter rotor BVI. Other uses and effects, however, are also contemplated by the present invention in connection with the use of rotor blades and other aerodynamic surfaces.

FIG. 4 is a cross-section view illustrating an oscillating air jet assembly 61 installed within a rotor blade 63. The rotor blade 63 comprises a leading edge 65, a trailing edge 67, an upper surface 69, a lower surface 71, and an interior volume 73. The oscillating air jet assembly 61 generally comprises a piston 75, a diaphragm 77, an aerodynamic surface 79, a chassis 81, a magnet 85, and a voice coil 88. A plurality of apertures 90 are disposed in the aerodynamic surface 79. The oscillating air jet assembly 61 preferably comprises a single unit which can be secured into a recess in the upper surface 69 via mounting apertures 94. Screws or bolts may be inserted into the mounting apertures 94 and secured into a frame of the rotor blade 63, to thereby secure the oscillating air jet assembly 61 within the interior volume 73 of the rotor blade 63.

The piston 75 is secured by a preferably flexible diaphragm 77 to an underside of the aerodynamic surface 79 by means such as an adhesive, for example. The diaphragm 77 holds the piston 75 in close proximity to the plurality of apertures 90, and also holds the piston 75 in an orientation to place the voice coil 88 in close proximity to the magnet 85. The piston 75 preferably comprises a strong and lightwieght material, such as an aluminum honeycomb or other composite material. The diaphragm 77 preferably comprises a flexible material having both a resilient characteristic and a memory characteristic. As presently embodied, the flexible diaphragm comprises silicone rubber with a fiberglass reinforcement material added thereto. The diaphragm 77 preferably creates a sealed chamber between the piston 75 and the plurality of apertures 90 on the aerodynamic surface 79.

The voice coil 88 preferably comprises a cylindrical structure which is attached to a bottom surface of the piston 75. The piston 75 is also cylindrically shaped. A single wire is wound around a cylindrical wall to thereby form the voice coil 88. The wire is routed from the voice coil 88 to a conductor path 98. As presently embodied, the magnet 85 comprises a rare-earth material for providing a fixed magnetic field. Other means for providing a fixed magnetic field, however, may be used as is known in the art. For example, a single-wire winding may be used. The magnet 85 is preferably ring-shaped, to thereby accommodate the voice coil 88 therein.

An oscillating signal is fed from the conductor path 98 to the voice coil 88 to thereby generate an oscillating magnetic field, which when coupled with the fixed magnetic field from the magnet 85, produces electrodynamic forces for moving the piston 75. Movement of the piston 75 in a direction toward the plurality of apertures 90 forces air out through the aerodynamic surface 79. Similarly, movement of the piston 75 in a direction away from the apertures 90 draws air through the plurality of apertures 90 and into the aerodynamic surface 79.

As an alternative embodiment to the circular piston 75, voice coil 88, and magnet 85, other elliptical shapes may be implemented. According to one alterative embodiment, an oval shape may be used for the piston 75, the magnet 85, and the voice coil 88. The oval shapes of the elements 75, 85, 88 can extend along a length of the rotor blade 63 to provide a perhaps more advantageous configuration. An oval shape is contemplated to provide specific stability features which may be suitable for various specific acceleration forces which are experienced at different points along a rotating rotor blade.

The voice coil 88 may be energized via the conductor path 98 continuously or according to predefined parameters. A controller 100 can issue signals to the conductor path 98 via a juncture 102, for example. As discussed below with reference to FIGS. 9–16, the controller 100 can receive and process information from an upper pressure sensor 105 and a lower pressure sensor 110.

Electrical signals can also be supplied to the conductive path 98 via another conductive path 112 which may be responsive to user inputs, for example. Power is supplied to the oscillating air jet assembly 61 via the other conductive path 112 or, alternatively, a local power source such as a battery (not shown) may be implemented. A conductive path 116 connects the controller 100 to the upper pressure sensor 105 and the lower pressure sensor 110, as presently embodied. In alternative embodiments where the piston 75 is driven continuously or where the piston 75 is driven from a source other than the controller 100, the controller 100 may be eliminated. Alternatively, the controller 100 may be positioned in other locations, such as a location outside of the rotor blade 63.

The single-wire winding disposed around the cylindrical wall, which is attached to the piston 75, is referred to herein as a voice coil 88 for illustrative purposes only. Voice coils of loud speakers, for example, comprise differently proportioned elements which are adapted to perform different functions than the elements of the oscillating air jet assembly 61. The voice coil 88 and piston 75 are configured, for example, to produce pressures which are on an order of magnitude greater than pressures produced by prior art loud speakers. Loud speakers, for example, do not typically comprise pistons 75 formed of lightweight, rigid materials. The plot illustrated in FIG. 8 shows peak velocity versus jet oscillation frequency, for diaphragms 25 of different stiffnesses. The plot 117 corresponding to a two-ply diaphragm 25 provides a larger peak velocity through the aperture 41, compared to the plot 119 corresponding to a single-ply diaphragm 25.

Additionally, a ratio of the voice coil 88 diameter to the piston 75 diameter is relatively small, compared to ratios of typical voice coil speaker systems. This ratio of the voice coil 88 diameter to the piston 75 diameter is preferably less than or equal to about one half and, in the illustrated embodiment, is equal to about 0.67.

The piston 75 is adapted to oscillate at relatively low frequencies, compared to piezoelectric diaphragms, such as the diaphragm 25 illustrated in FIG. 1. The relatively small volume of air between the piston 75 and the plurality of apertures 90 provides the oscillating air jet assembly 61 with a relatively large compression ratio, which is sufficient to generate relatively high velocities of air through the plurality of apertures 90. The spring rate and moving mass of the piston 75 and diaphragm 77 may be tuned to allow for an operation which is always at the system's natural frequency to further enhance efficiency. When utilized in a helicopter blade, for example, the mass of the oscillating air jet assembly 61 may be located at a forward location of the normal center of mass of the rotor blade 63. Consequently, the oscillating air jet assembly 61 may be substituted for the tip and/or leading edge weight which is typically present in a rotor blade.

FIGS. 5–7 disclose other oscillating air jet assembly embodiments. The discussion of FIG. 4 applies in large part to the discussion below with reference to FIGS. 5–7. The oscillating air jet assemblies of FIGS. 4–7 can be implemented in virtually any rotor blade and, additionally, can be constructed for use in fixed wing applications including engine inlets (for stall alleviation) and exhaust (for vectoring). The oscillating air jet assemblies of the present invention, including the device disclosed in FIG. 1, can further be used in non-aircraft applications and with other fluids in addition to air, in addition to the above-described applications of the invention. Similarly to the embodiment of FIG. 4, the oscillating air jet assemblies of FIGS. 5–7 are configured to output relatively high energy levels, compared to the embodiment of FIG. 1. All of the oscillating air jet assemblies of the present invention provide benefits including reduced mechanical complexity, reduced compromise of structural integrity, relatively simple manufacturing, reduced aerodynamic drag, reduced air-source power requirements, greater flexibility in placement and less impact on structure, and reduced radar detectability relative to the edges, gaps, and angles formed by conventional aerodynamic control surfaces or Coanda slots, for example.

In the embodiment of FIG. 5, like elements are designated with like reference numerals followed by the letter "a." The oscillating air jet assembly 120 comprises a voice coil 88a connected between a diaphragm 77a and a cone 124. The cone 124 may comprise a nickel electroform material, for example, and the diaphragm 77a is preferably constructed of a material suitable for holding and aligning the cone 124 within the magnet 85a.

In FIGS. 4–7, only a single oscillating air jet assembly is illustrated. Should a second oscillating air jet assembly be required for placement on the lower surface of the rotor blade, a second oscillating air jet assembly may be placed aft of the first oscillating air jet assembly. In FIG. 5, the first oscillating air jet assembly 120 extends between the 12.5 percent and the 22.5 percent chord positions. A second oscillating air jet assembly may be placed between the 22.5 percent and the 32.5 percent chord positions. Also, in the embodiments of FIGS. 4–7, the pressure sensors 105, 110 are disposed at the 5 percent blade chord position.

FIG. 6 illustrates an oscillating air jet assembly 130, according to the presently preferred embodiment. A piston 132, which preferably comprises an aluminum honeycomb material, is held in place by a first diaphragm 135 and a second diaphragm 137. Both the first diaphragm 135 and the second diaphragm 137 preferably comprise a silicone rubber having a fiberglass reinforcement. A connecting member 139, which preferably comprises aluminum, connects the piston 132 to the second diaphragm 137.

The combination of the first diaphragm 135 and the second diaphragm 137 provides sufficient strength, flexibility, and memory to properly align the voice coil 142 within the gaps of the magnet 145 during the dynamic operation of the rotor blade 63b. The fabrication of the connecting member 139 of aluminum provides for heat dissipation, to thereby dissipate heat generated by the voice coil 142, for example.

A sealed volume of air between the piston 132 and the plurality of apertures 90b is relatively small in the embodiment of FIG. 6, facilitating the generation of high jet pressures by the piston 132. In the embodiment of FIG. 6, for example, a first core 150 and a second core 152 are coupled to the magnet 145, to channel the magnetic flux from the magnet 145 to the voice coil 142. The first core 150 and the second core 152 form a gap, which accommodates the voice coil 142 therein. The first core 150 and the second core 152 help to align the voice coil 142, and further help to stabilize the voice coil 142 and prevent the voice coil 142 from contacting and rubbing against the cores 150, 152.

FIG. 7 illustrates another preferred embodiment of the present invention. In the embodiment of FIG. 7, like elements are denoted with like numerals, followed by the letter "c." The oscillating air jet assembly 155 of FIG. 7 generally comprises a piston 75c and a diaphragm 77c, both of which are similar to the piston 75 and the diaphragm 77 of FIG. 4. The oscillating air jet assembly 155 of FIG. 7 further comprises a voice coil 142c, a magnet 145c, a first core 150c, and a second core 152c, which are similar to the elements 142, 145, 150, and 152, respectively, of FIG. 6. As with the other illustrated embodiments, the chassis 81c is aluminum super plastic formed and the aerodynamic surface 79c comprises nickel hydroform.

FIGS. 9–16 illustrate results obtained from computational fluid dynamics (CFD) simulations of air flow over an exemplary rotor blade having oscillating air jet assemblies disposed on upper and lower surfaces thereof. The simulated rotor blade comprises a symmetric NACA-0012 airfoil. The simulations were performed using a free-stream Mach number (Minf) of 0.6 and an angle of attack (Alfa) of 0 degrees. In the simulations of FIG. 9–14, a peak jet velocity (vn) of 0.20 was used. A peak jet velocity (vn) of 0.05 was used for the simulations of FIGS. 15 and 16. Also, peak jet velocities of 0.05, 0.10, and 0.20 were used in the simulation of FIG. 10.

Figure 9:
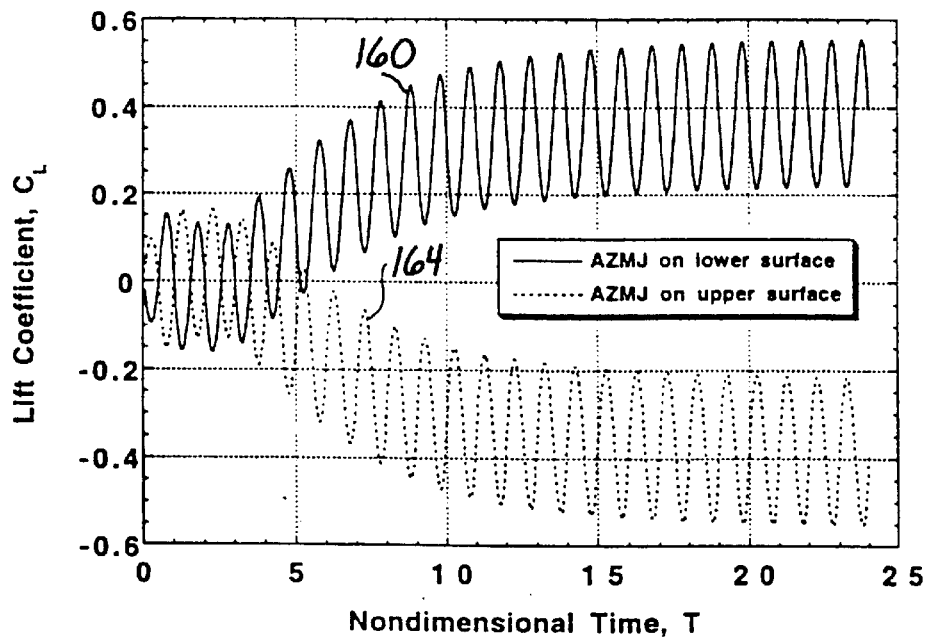

FIG. 9 illustrates a plot of lift coefficient versus non-dimensional time for an oscillating air jet assembly. An array of zero mass jets (AZMJ) is disposed on an upper surface of the simulated airfoil and on a lower surface of the simulated airfoil. The line 160 represents the results of a simulation for an AZMJ placed on a lower surface of an airfoil, and the line 164 represents a plot of the results of a simulation of an AZMJ placed on an upper surface of an airfoil. The jet oscillation frequency (f) was equal to 402 Hz in both simulations. FIG. 9 indicates that the activation of the lower surface AZMJ results in a net increase in the mean sectional lift. This result is similar to a simulation obtained from a trailing-edge flap down condition of an airfoil. Activation of the upper surface AZMJ results in a decrease in the sectional lift, which corresponds to a deployed trailing-edge flap up condition. The results of the simulations of FIG. 9 suggest that, when operated independently, the AZMJ systems can emulate substantially the same aerodynamic effects, in a mean sense, which are produced using a mechanical trailing-edge flap. The unsteady aerodynamic effects which result from a harmonically moving trailing-edge flap can thus be emulated, again in a mean sense, by repetitively activating and deactivating the upper and lower surface AZMJ systems.

Figure 10:
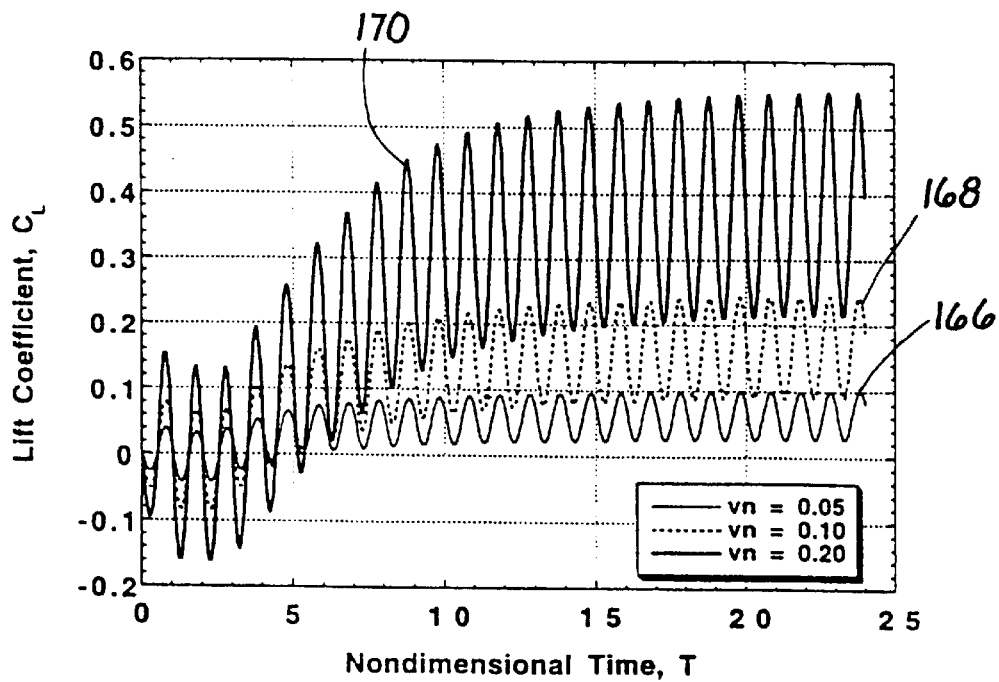

FIG. 10 illustrates several simulations of an active lower surface AZMJ using various peak jet velocities (vn). The term peak jet velocity refers to a peak velocity of air entering or exiting an aperture of an oscillating air jet assembly divided by the free stream speed of sound. The first plot 166 corresponds to a simulation using a peak jet velocity of 0.05, and the second plot 168 corresponds to a simulation using a peak jet velocity of 0.10. The third plot 170 corresponds to a simulation using a peak jet velocity of 0.20. A jet oscillation frequency of 402 Hz was used for each of the plots 166, 168, and 170. FIG. 10 indicates a direct relationship between jet peak velocity and the attainable mean lift value. The higher jet peak velocity of 0.20 generated a higher lift coefficient, as indicated by the plot 170.

Figure 11:
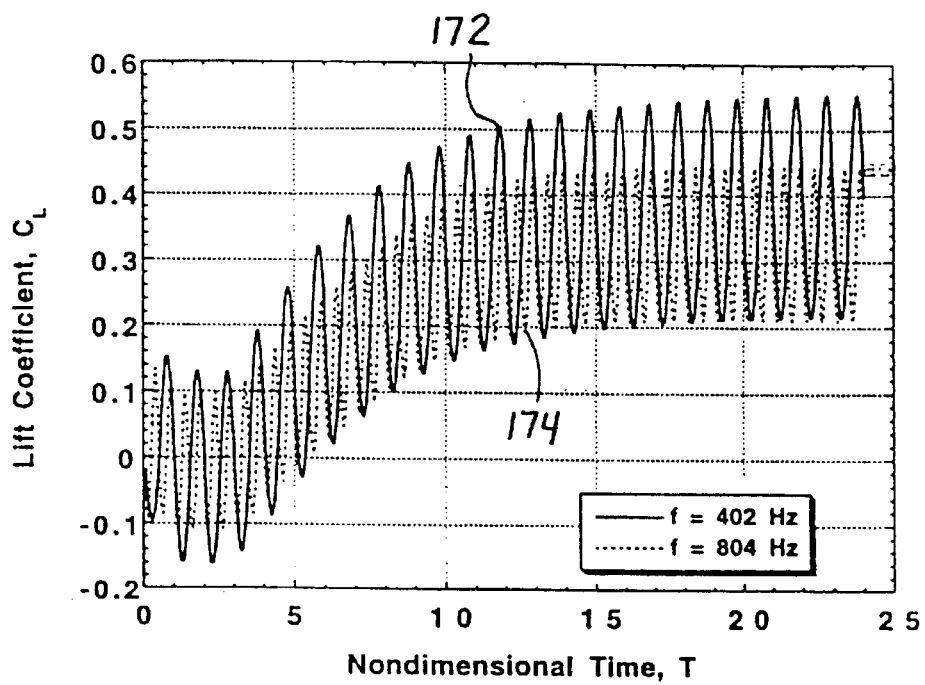

FIG. 11 illustrates a plot of lift coefficient versus non-dimensional time for simulations using two different oscillation frequencies. The plot 172 corresponds to a simulation using a jet oscillation frequency of 402 Hz, and the plot 174 corresponds to a simulation using a jet oscillation frequency of 804 Hz. The results of FIG. 11 indicate that higher oscillation frequencies are associated with lower mean sectional lift values. These results also suggest that the jet oscillation frequency can be used as an alternative parameter to the jet peak velocity for controlling the attainable mean sectional lift values.

Figure 12:
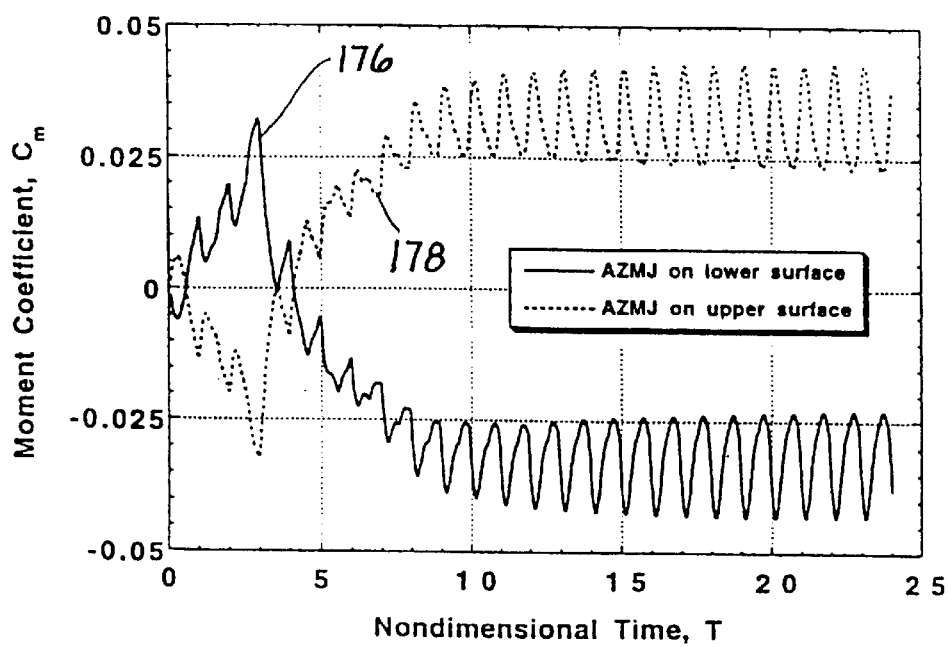

FIG. 12 illustrates a plot of moment coefficient versus non-dimensional time for simulations incorporating an AZMJ on a lower surface and an AZMJ on an upper surface of an airfoil. The plot 176 corresponds to a simulation of an AZMJ system on a lower surface of an airfoil, and the plot 178 corresponds to a simulation of an AZMJ device on an upper surface of an air foil. A jet oscillation frequency of 402 Hz was used for both simulations. FIG. 12 indicates that the activation of the lower surface AZMJ system results in a negative pitching moment (nose down), which effect is similar to that obtained by deploying a trailing-edge flap down. The activation of the upper surface AZMJ results in a positive pitching moment (nose up), which effect is similar to that obtained by deploying a trailing-edge flap up. The results of FIGS. 9 and 12 suggest that, when operated independently, the AZMJ systems can emulate similar aerodynamic effects, in a mean sense, to those produced using a mechanical trailing-edge flap.

Figure 13:
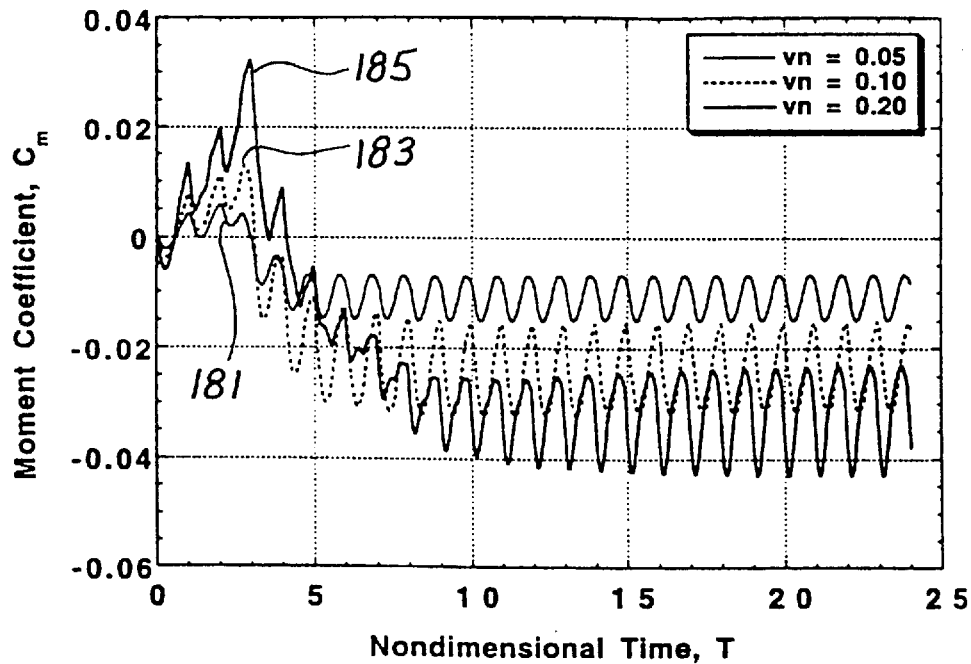
Figure 14:
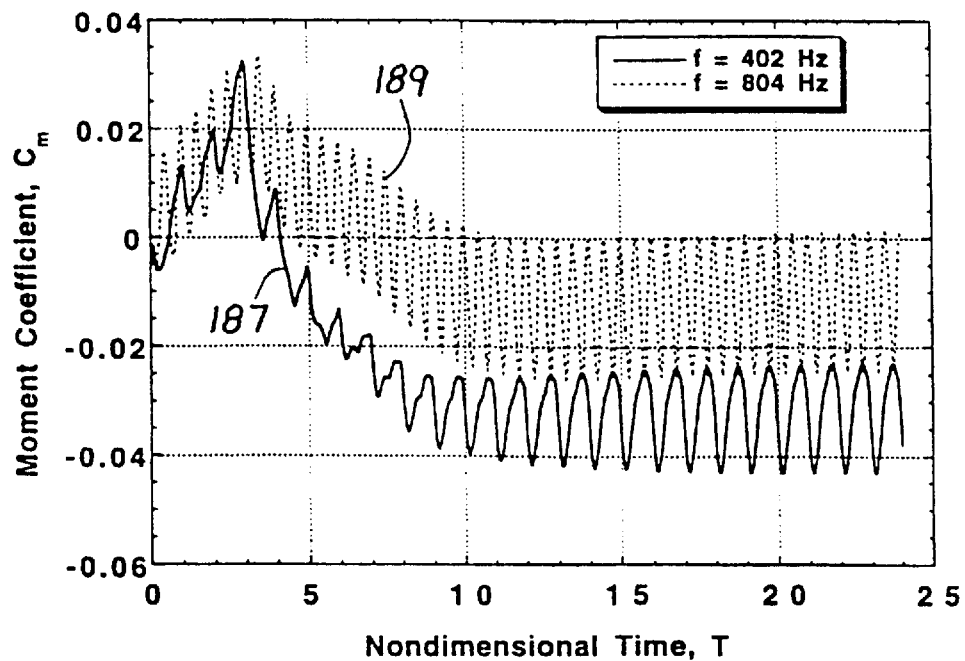

FIGS. 13 and 14 are plots of non-dimensional time versus moment coefficient for various simulations. The simulations of FIG. 13 vary the peak jet velocities, and the simulations of FIG. 14 vary the jet oscillation frequencies. The simulations of both FIG. 13 and FIG. 14 were conducted for active lower surface AZMJ systems. The plot 181 in FIG. 13 corresponds to a simulation using a peak jet velocity of 0.05, and the plot 183 corresponds to a simulation using a peak jet velocity of 0.10. The plot 185 corresponds to a simulation using a peak jet velocity of 0.020. FIG. 13 indicates a direct relationship between the peak jet velocity and levels of the attainable pitching moment values. As the jet peak velocity is increased, the levels of the attainable pitching moment values are likewise increased.

FIG. 14 illustrates a first plot 187 of moment coefficient versus non-dimensional time, corresponding to a jet oscillation frequency of 402 Hz. The plot 189 corresponds to a simulation using a jet oscillation frequency of 804 Hz. The plots of FIG. 14 indicate that the jet oscillation frequency can also be used, in addition to the peak jet velocity, as a means for altering the attainable mean pitching moment values.

The controller 100 of FIGS. 4–7 can be used to instruct the piston 75, or the cone 124 to oscillate with various intensities and frequencies. Additionally, the controller 100 can instruct a lower piston (not shown) to oscillate with various intensities and frequencies, according to the present invention. Instructions to vary the parameters of operation of upper and lower pistons can be generated by a microprocessor (not shown), by the sensors 105, 110, or by other means such as a user input via the other conductive path 112. The instructions may alternatively originate within the controller 100.

A piston on a lower surface of an airfoil can be oscillated to increase an amount of lift generated by the rotor blade, in response to an instruction to the controller to either increase the lift or to generate a negative pitching moment (nose down) on the rotorcraft. A piston disposed on the upper surface of an air foil can be oscillated to decrease an effective amount of lift generated by the rotor blade, in response to an instruction to decrease an amount of lift or to generate a positive pitching moment (nose up). Additionally, a piston on the upper surface of an airfoil may be oscillated at a higher frequency to effectively increase an amount of lift of the rotor blade, and may be oscillated at a lower frequency to effectively decrease an amount of lift generated by the rotor blade. A similar situation applies for a piston disposed on a lower surface of an air foil, where greater frequencies reduce lift and smaller frequencies increase lift. Instructions may be input into the controller 100 to change the lift generated by the rotor blade and/or the pitching moment generated by the rotor blade, by varying the frequency of one or more pistons.

Additionally, a piston on an upper surface of an airfoil may be oscillated at a greater energization level to effectively decrease the lift of the rotor blade, and may be oscillated at an effectively lower energization level to effectively increase the lift of the rotor blade. A piston disposed on a lower surface of an airfoil may be oscillated at a greater energization level to generate greater lift, and may be oscillated at a lower energization level to decrease lift. Instructions may be input into the controller 100 to effect different amounts of lift and/or pitching moments by changing the energization level of the piston or cone.

Figure 15:
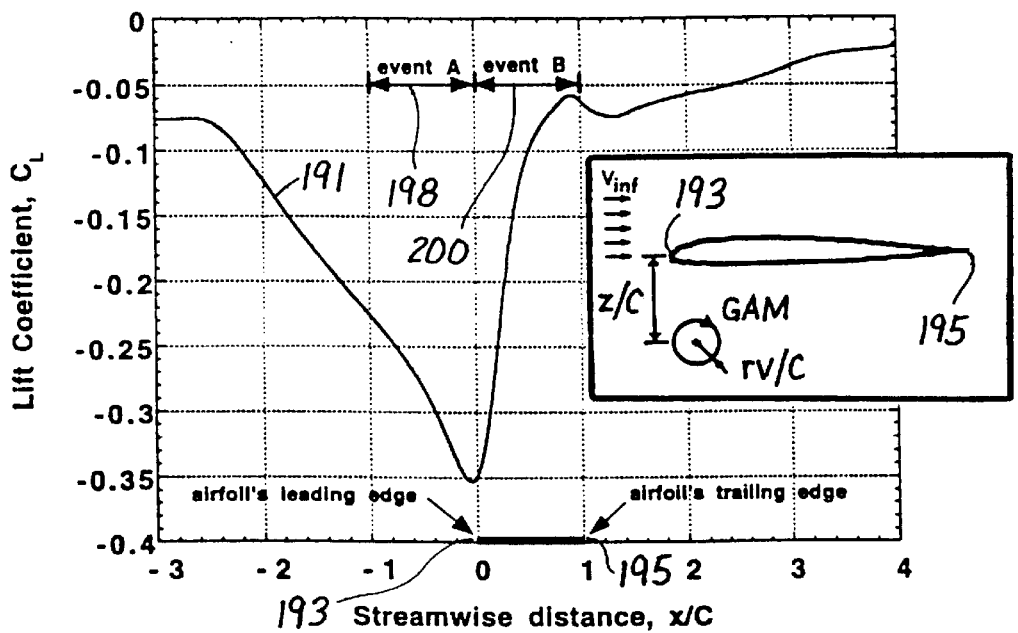

FIG. 15 is a plot of lift coefficient versus stream-wise distance. The plot 191 illustrates a simulated temporal variation of the sectional lift for the NACA-0012 airfoil during parallel interaction with a vortex of strength (GAM), equal to 0.20, having a core radius (rv) equal to 0.25C (C is the chord length of the airfoil), and located at a miss distance (Zv) equal to minus 0.25C. The air foil experiences a continuous decrease in its sectional lift values as the vortex approaches the leading edge of the airfoil, as indicated in FIG. 15. Once the vortex passes beyond the leading edge of the air foil, there is a rapid increase in the airfoil's sectional lift values. The rapid increase continues and eventually levels off as the vortex moves further downstream of the airfoil's trailing edge. In the absence of the simulated vortex of FIG. 15, the airfoil's sectional lift value would be equal to zero by virtue of the air foil's geometric symmetry.

The oscillating air jet assemblies of the present invention can be synchronized together by the controller 100 (FIGS. 4–7, for example) to attenuate the aerodynamics which contribute to BVI. The temporal lift distribution of FIG. 15 is partitioned into Event A indicated by the reference numeral 198 and an Event B indicated by the reference numeral 200. Event A is associated with the observed decrease in the sectional lift which takes place as the vortex approaches the air foil's leading edge 193, and Event B is associated with the observed rapid increases in the sectional lift as the vortex passes and continues to move downstream beyond the airfoil's leading edge 193. An oscillating air jet assembly is provided on the lower surface of the airfoil in order to reduce the rate at which the sectional lift is decreasing. The oscillating air jet assembly on the lower surface of the airfoil operates to increase the airfoil's sectional lift values, when sectional lift is decreasing on the lower surface of the airfoil. The controller 100 controls the oscillating air jet assembly on the lower surface of the airfoil only until the vortex reaches the airfoil's leading edge 193. Thus, the oscillating air jet assembly on the lower surface is active only before and during Event A.

The upper pressure sensor 105 and the lower pressure sensor 110 operate to detect a change in the sign of the temporal variation of the differential pressure, which is proportional to the airfoil's sectional lift. Thus, the differential pressure is obtained at a first point in time by subtracting the pressure from the upper pressure sensor 105 from the pressure of the lower pressure sensor 110. This differential pressure will remain negative during Event A, while the vortex is upstream of the airfoil's leading edge 193, and the temporal gradients will also remain negative. Once the vortex moves beyond the air foil's leading edge 193, the differential pressure becomes positive and their temporal gradients also become positive. The gradient is determined by comparing a current sensed differential pressure with a previously sensed differential pressure. A memory location can be used to store the previously sensed differential pressure with the current sensed differential pressure.

At the transition between Event A and Event B, the lower surface oscillating air jet assembly is deactivated by the controller 100, and the upper surface oscillating air jet assembly is activated by the controller 100. By activating the upper surface oscillating air jet assembly, the controller 100 attempts to reduce or neutralize the rate at which the airfoil's lift is increasing by virtue of the interaction of the airfoil with the vortex. Since negative lift values are achieved by activating an upper surface oscillating air jet assembly, the rapid increase in lift is indeed attenuated.

Figure 16:
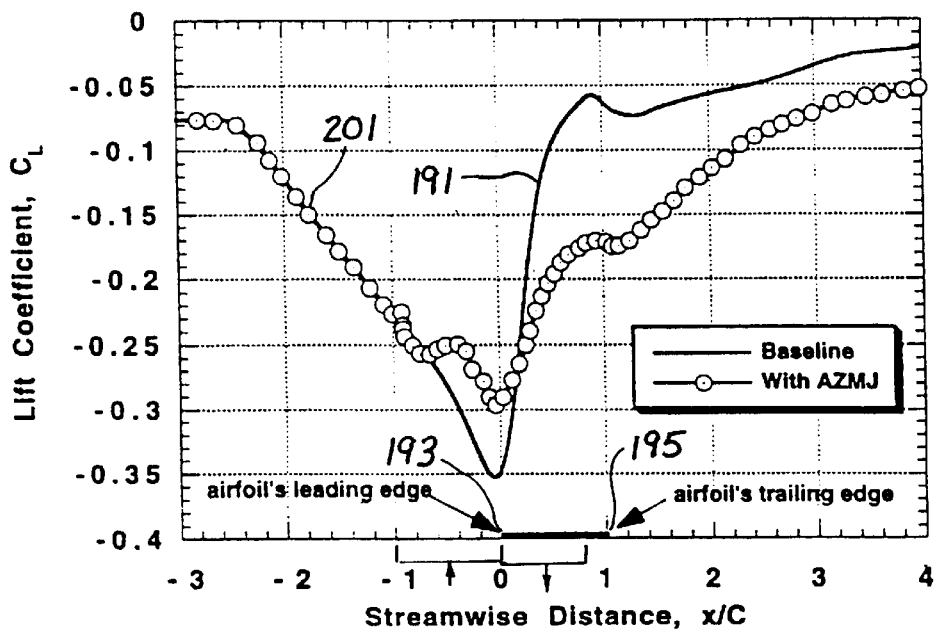

FIG. 16 illustrates a plot of lift coefficient versus streamwise distance for the situation of FIG. 15. In this plot, the peak jet velocity is equal to 0.05 and the jet oscillation frequency is equal to 100.5 Hz. In this simulation, represented by the plot 201 in FIG. 16, the lower surface oscillating air jet assembly was activated when the vortex was approximately at a distance of one chord length ahead of the airfoil. The upper surface oscillating air jet assembly was deactivated when the vortex reached the air foil's 0.75C chord position. The plot 191 of FIG. 15, depicting the original uncompensated airfoil response to the vortex passage, is also shown in FIG. 16. An approximately 55 percent reduction in the peak-to-peak lift values is achieved with the control technique of the present invention, according to the simulation. The reduction and the associated decrease in the temporal rates of variation of the airfoil's sectional lift translate into lower BVI noise levels.

Since BVI is typically felt by at least the outboard 40–50% of the rotor blade, the present invention contemplates multiple oscillating air jet assemblies along the length of the rotor blade. In addition to oscillating air jet assemblies incorporating cones or pistons, other oscillating air jet assemblies, such as the diaphragm disclosed in FIG. 1, for example, are contemplated by the present invention. In an embodiment having multiple oscillating air jet assemblies along the outboard 40–50% of the rotor blade, operation of the device is generally dependent on the sensitivity of the leading edge pressure sensors and detecting changes in the signs of the temporal gradients of the differential pressures. Also, since multiple interactions are usually present in helicopter rotor BVI, the frequency of the activation/deactivation of the lower and upper oscillating air jet assemblies will be proportional to the number of interactions being detected, for a given rotor blade radial station. The peak jet velocities and/or the jet oscillation frequencies may be tailored to the particular radial station, using higher peak jet velocities for the stronger interactions occurring near the tip of the rotor blade and lower peak velocities for the weaker interactions which occur at the more inboard radial stations of the rotor blade.

Since the oscillating air jet assemblies of the present invention do not require external equipment for adding and subtracting air mass, complex control systems for administering air to the rotor blades are not required. The power requirements for the oscillating air jet assemblies of the present invention are relatively small. For example, the piezoelectric cells comprising the diaphragm of FIG. 1 are typically driven with power requirements on the order of a few miliwatts.

The oscillating air jet assemblies of the present invention are able to change the local aerodynamics of the airfoil (blade) independent of the vortex strength, the blade/vortex separation distances, and the number of the blade/vortex encounters. Peak jet velocity and oscillation frequency are adaptable to changing BVI conditions which are associated with changes in the decent rate and forward flight speed. The adaptability of peak jet velocities and oscillation frequencies to changing BVI conditions, according to the present invention, presents an advantage over passive BVI noise control systems. Applications of the oscillating air jet assemblies of the present invention can be especially useful in low speed decent flight conditions, which typically give rise to BVI noise. The oscillating air jet assemblies can be deactivated or operated at new conditions, such as peak jet velocity and oscillation frequency, for other flight conditions, depending upon the desired effect. The oscillating air jet assemblies of the present invention can also be activated and deactivated for purposes such as lift augmentation during maneuvering flight, retreating blade lift enhancement during high-speed forward flight, and vibration reduction. The oscillating air jets of the present invention may also be used to address aerodynamic/dynamic blade twist modifications.

Although exemplary embodiments of the invention have been shown and described, many other changes, modifications and substitutions, in addition to those set forth in the above paragraphs, may be made by one having ordinary skill in the art with out necessarily departing from the spirit and scope of this invention.

We claim:

1. An active control system for reducing blade-vortex-interaction (BVI) noise generated by a rotor blade, the rotor blade including an interior, a tip end, a root end, and an aerodynamic surface comprising a leading edge, a trailing edge, an upper surface, and a lower surface, the active control system comprising:

a sensor assembly in close proximity to the rotor blade, the sensor assembly being adapted to detect a change in air pressure on the aerodynamic surface of the rotor blade near the leading edge of the rotor blade, the change in air pressure having a magnitude;

a device for changing a lift generated by the rotor blade, the device being adapted to be activated to thereby change the lift of the rotor blade while the rotor blade is maintained at a constant rotational velocity, the device for changing a lift generated by the rotor blade comprising at least one aperture on the rotor blade and a diaphragm in the interior of the rotor blade, the diaphragm being adapted to be activated and moved between a first position and a second position at a frequency, whereby movement of the diaphragm from the first position to the second position pushes air out of the at least one aperture and movement of the diaphragm from the second position to the first position draws air into the at least one aperture; and a controller for activating the device upon the detected change in air pressure by the sensor assembly, the controller activating the device to change the lift of the rotor blade in order to introduce a compensating pressure onto the aerodynamic surface of the rotor blade, the compensating pressure being adapted to attenuate the magnitude of the change of air pressure.

2. The active control system as recited in claim 1, wherein:

the controller is adapted to activate the device to reduce an air pressure on the lower surface of the rotor blade, upon a determination that an air pressure on the lower surface of the rotor blade in a vicinity of the leading edge has increased; and the controller is adapted to activate the device to increase an air pressure on the lower surface of the rotor blade, upon a determination that an air pressure on the lower surface of the rotor blade in a vicinity of the leading edge has decreased.

3. The active control system as recited in claim 2, wherein:

the at least one aperture comprises at least one aperture on the upper surface of the rotor blade;

the controller is adapted to activate the device to push air out of and draw air into the at least one aperture on the upper surface of the rotor blade, upon the determination that a pressure on the lower surface of the rotor blade in a vicinity of the leading edge has increased;

the at least one aperture further comprises at least one aperture on the lower surface of the rotor blade; and the controller is adapted to activate the device to push air out of and draw air into the at least one aperture on the lower surface of the rotor blade, upon the determination that a pressure on the lower surface of the rotor blade in a vicinity of the leading edge has decreased.

4. A method of changing an amount of lift generated by a rotor blade, the rotor blade having an aerodynamic surface and an interior volume, the aerodynamic surface including an upper surface and a lower surface, the method comprising the following steps:

providing at least one aperture on the lower surface of the rotor blade;

providing a diaphragm in the interior volume of the rotor blade, the diaphragm being movable between a first position and a second position, whereby movement of the diaphragm from the first position to the second position pushes air out of the at least one aperture and movement of the diaphragm from the second position to the first position draws air into the at least one aperture;

receiving into a controller an instruction to increase an amount of lift generated by the rotor blade; and moving the diaphragm between the first position and the second position to thereby increase the amount of lift generated by the rotor blade.

5. A method of changing an amount of lift generated by a rotor blade, the rotor blade having an aerodynamic surface and an interior volume, the aerodynamic surface including an upper surface and a lower surface, the method comprising the following steps:

providing at least one aperture on the lower surface of the rotor blade;

providing a diaphragm in the interior volume of the rotor blade, the diaphragm being movable between a first position and a second position, whereby movement of the diaphragm from the first position to the second position pushes air out of the at least one aperture and movement of the diaphragm from the second position to the first position draws air into the at least one aperture;

receiving into a controller an instruction to generate a negative pitching moment on the rotor blade; and moving the diaphragm between the first position and the second position to thereby increase the amount of lift generated by the rotor blade.

6. A method of changing an amount of lift generated by a rotor blade, the rotor blade having an aerodynamic surface and an interior volume, the aerodynamic surface including an upper surface and a lower surface, the method comprising the following steps:

providing at least one aperture on the aerodynamic surface of the rotor blade, the step of providing at least one aperture comprising a step of providing at least one aperture on the upper surface of the rotor blade;

providing a diaphragm in the interior volume of the rotor blade, the diaphragm being movable between a first position and a second position, whereby movement of the diaphragm from the first position to the second position pushes air out of the at least one aperture and movement of the diaphragm from the second position to the first position draws air into the at least one aperture; and receiving into a controller an instruction to decrease an amount of lift generated by the rotor blade;

moving the diaphragm between the first position and the second position to thereby change the amount of lift generated by the rotor blade, the step of moving the diaphragm comprising a step of moving the diaphragm between the first position and the second position to thereby decrease an amount of lift generated by the rotor blade.

7. A method of changing an amount of lift generated by a rotor blade, the rotor blade having an aerodynamic surface and an interior volume, the aerodynamic surface including an upper surface and a lower surface, the method comprising the following steps:

providing at least one aperture on the aerodynamic surface of the rotor blade, the step of providing at least one aperture comprising a step of providing at least one aperture on the upper surface of the rotor blade;

providing a diaphragm in the interior volume of the rotor blade, the diaphragm being movable between a first position and a second position, whereby movement of the diaphragm from the first position to the second position pushes air out of the at least one aperture and movement of the diaphragm from the second position to the first position draws air into the at least one aperture;

receiving into a controller an instruction to generate a positive pitching moment on the rotor blade; and moving the diaphragm between the first position and the second position to thereby change the amount of lift generated by the rotor blade, the step of moving the diaphragm comprising a step of moving the diaphragm between the first position and the second position to thereby decrease an amount of lift generated by the rotor blade.

8. A method of changing an amount of lift generated by a rotor blade, the rotor blade having an aerodynamic surface and an interior volume, the aerodynamic surface including an upper surface and a lower surface, the method comprising the following steps:

providing at least one aperture on the aerodynamic surface of the rotor blade;

providing a diaphragm in the interior volume of the rotor blade, the diaphragm being movable between a first position and a second position, whereby movement of the diaphragm from the first position to the second position pushes air out of the at least one aperture and movement of the diaphragm from the second position to the first position draws air into the at least one aperture;

moving the diaphragm between the first position and the second position to thereby change the amount of lift generated by the rotor blade, the step of moving the diaphragm comprising a step of moving the diaphragm between the first position and the second position at a predetermined frequency to thereby affect an amount of lift generated by the rotor blade; and changing the predetermined frequency, to thereby change an amount of lift generated by the rotor blade.

9. The method as recited in claim 1, the step of changing the predetermined frequency being proceeded by the following step:

receiving into a controller an instruction to change an amount of lift generated by the rotor blade.

10. The method as recited in claim 1, the step of changing the predetermined frequency being proceeded by the following step:

receiving into a controller an instruction to change a pitching moment generated by the rotor blade.

11. The method as recited in claim 1, wherein:

the step of providing at least one aperture comprises a step of providing at least one aperture on the upper surface of the rotor blade;

the step of moving the diaphragm comprises a step of moving the diaphragm between the first position and the second position at a predetermined frequency to thereby decrease an amount of lift generated by the rotor blade; and the step of changing the predetermined frequency comprises a step of decreasing the predetermined frequency to thereby further increase an amount of negative lift generated by the rotor blade.

12. The method as recited in claim 11, wherein:

the step of changing the predetermined frequency comprises an additional step of increasing the predetermined frequency to thereby effectively decrease an amount of negative lift generated by the rotor blade.

13. The method as recited in claim 8, wherein:

the step of providing at least one aperture comprises a step of providing at least one aperture on the upper surface of the rotor blade;

the step of moving the diaphragm comprises a step of moving the diaphragm between the first position and the second position at a predetermined frequency to thereby decrease an amount of lift generated by the rotor blade; and the step of changing the predetermined frequency comprises a step of increasing the predetermined frequency to thereby effectively increase an amount of lift generated by the rotor blade, relative to the amount of lift generated by the rotor blade by the diaphragm at the predetermined frequency.

14. The method as recited in claim 8, wherein:

the step of providing at least one aperture comprises a step of providing at least one aperture on the lower surface of the rotor blade;

the step of moving the diaphragm comprises a step of moving the diaphragm between the first position and the second position at a predetermined frequency to thereby increase an amount of lift generated by the rotor blade; and the step of changing the predetermined frequency comprises a step of decreasing the predetermined frequency to thereby further increase an amount of lift generated by the rotor blade.

15. The method as recited in claim 14, wherein:

the step of changing the predetermined frequency comprises an additional step of increasing the predetermined frequency to thereby decrease an amount of lift generated by the rotor blade.

16. A method of changing an amount of lift generated by a rotor blade, the rotor blade comprising an upper surface, a lower surface, and an interior volume, the method comprising the following steps:

providing at least one aperture on the rotor blade;

providing a diaphragm in the interior volume of the rotor blade, the diaphragm being movable in a first direction and a second direction, whereby movement of the diaphragm in the second direction pushes air out of the at least one aperture and movement of the diaphragm in the first direction draws air into the at least one aperture;

moving the diaphragm in both the first direction and the second direction at a predetermined energization level, the predetermined energization level corresponding to a predetermined range of motion of the diaphragm in the first and second directions, and corresponding to a speed of movement of the diaphragm in the first and second directions, whereby movement of the diaphragm at the predetermined energization level results in air being pushed out of and drawn into the at least one aperture at a peak velocity, and whereby movement of the diaphragm at the predetermined energization level affects the amount of lift generated by the rotor blade; and changing the predetermined energization level, to thereby change at least one of the range of motion and the speed of movement of the diaphragm, the changing of the predetermined energization level changing an amount of lift generated by the rotor blade.

17. The method of increasing an amount of lift generated by a rotor blade as recited in claim 16, the step of changing the predetermined energization level being proceeded by the following step:

receiving into a controller an instruction to change an amount of lift generated by the rotor blade.

18. The method of increasing an amount of lift generated by a rotor blade as recited in claim 16, the step of changing the predetermined energization level being proceeded by the following step:

receiving into a controller an instruction to change one of the lift and a pitching moment of the rotor blade.

19. The method as recited in claim 16, wherein:

the step of providing at least one aperture comprises a step of providing at least one aperture on the upper surface of the rotor blade;

the step of moving the diaphragm comprises a step of moving the diaphragm at the predetermined energization level to thereby decrease an amount of lift generated by the rotor blade; and the step of changing the predetermined energization level comprises a step of decreasing the predetermined energization level to thereby effectively increase an amount of lift generated by the rotor blade.

20. The method as recited in claim 19, wherein:

the step of changing the predetermined energization level comprises an additional step of increasing the predetermined energization level to thereby decrease an amount of lift generated by the rotor blade.

21. The method as recited in claim 19, wherein:

the step of providing at least one aperture comprises a step of providing at least one aperture on the lower surface of the rotor blade;

the step of moving the diaphragm comprises a step of moving the diaphragm at the predetermined energization level to thereby increase an amount of lift generated by the rotor blade; and the step of changing the predetermined energization level comprises a step of increasing the predetermined energization level to thereby increase an amount of lift generated by the rotor blade, relative to the amount of lift generated by the rotor blade by the diaphragm at the predetermined energization level.

22. The method of increasing an amount of lift generated by a rotor blade as recited in claim 21, the step of increasing the predetermined energization level being proceeded by the following step:

receiving into a controller an instruction to increase amount of lift generated by the rotor blade.

23. The method of increasing an amount of lift generated by a rotor blade as recited in claim 21, the step of increasing the predetermined energization level being proceeded by the following step:

receiving into a controller an instruction to increase a negative pitching moment of the rotor blade.

24. A method of reducing blade-vortex-interaction (BVI) noise generated by a rotor blade, the rotor blade including an interior, a tip end, a root end, a leading edge, a trailing edge, an upper surface, and a lower surface, the method comprising the following steps:

providing a sensor assembly in close proximity to the rotor blade;

providing on the rotor blade a device for changing a lift generated by the rotor blade, the device when activated being adapted to change the lift of the rotor blade while the rotor blade is maintained at a constant rotational velocity, wherein the step of providing on the rotor blade a device for changing a lift generated by the rotor blade comprises the steps of providing at least one aperture on the rotor blade and providing a diaphragm in the interior of the rotor blade, the diaphragm being adapted to be activated and moved between a first position and a second position at a frequency, whereby movement of the diaphragm from the first position to the second position pushes air out of the at least one aperture and movement of the diaphragm from the second position to the first position draws air into the at least one aperture;

determining with the sensor assembly a change in pressure on the rotor blade near the leading edge of the rotor blade, the change in pressure having a magnitude; and activating the device to change the lift of the rotor blade in order introduce a compensating pressure onto the rotor blade, the compensating pressure being adapted to attenuate the magnitude of the change in pressure.

25. The method as recited in claim 24, wherein:

the determining step comprises a step of determiing that a pressure on the lower surface of the rotor blade in a vicinity of the leading edge has increased; and the step of activating the device comprises a step of activating the device to reduce a pressure on the lower surface of the rotor blade.

26. The method as recited in claim 25, wherein:

the step of providing at least one aperture on the rotor blade comprises a step of providing at least one aperture on the upper surface of the rotor blade; and the step of activating the device comprises a step of pushing air out of and drawing air into the at least one aperture on the upper surface of the rotor blade.

27. The method as recited in claim 24, wherein:

the determining step comprises a step of determiing that a pressure on the lower surface of the rotor blade in a vicinity of the leading edge has decreased; and the step of activating the device comprises a step of activating the device to increase a pressure on the lower surface of the rotor blade.

28. The method as recited in claim 27, wherein:

the step of providing at least one aperture on the rotor blade comprises a step of providing at least one aperture on the lower surface of the rotor blade; and the step of activating the device comprises a step of pushing air out of and drawing air into the at least one aperture on the lower surface of the rotor blade.

29. A method of reducing blade-vortex-interaction (BVI) noise generated by a rotor blade, the rotor blade including an interior, a tip end, a root end, a leading edge, a trailing edge, an upper surface, and a lower surface, the method comprising the following steps:

providing a sensor assembly in close proximity to the rotor blade;

providing on the rotor blade a device for changing a lift generated by the rotor blade, wherein the step of providing on the rotor blade a device for changing a lift generated by the rotor blade comprises the steps of providing at least one aperture on the rotor blade and providing a diaphragm in the interior of the rotor blade, the diaphragm being adapted to be activated and moved between a first position and a second position at a frequency, whereby movement of the diaphragm from the first position to the second position pushes air out of the at least one aperture and movement of the diaphragm from the second position to the first position draws air into the at least one aperture;

first determining with the sensor assembly that a decrease in pressure has occurred on the lower surface of the rotor blade near the leading edge of the rotor blade;

first activating the device to increase a lift of the rotor blade;

second determining with the sensor assembly that an increase in pressure has occurred on the lower surface of the rotor blade near the leading edge of the rotor blade; and second activating the device to decrease a lift of the rotor blade.

30. The method as recited in claim 29, wherein:

the step of providing at least one aperture on the rotor blade comprises a step of providing at least one aperture on the lower surface of the rotor blade; and the first activating step comprises a step of pushing air out of and drawing air into the at least one aperture on the lower surface of the rotor blade, to thereby increase a lift of the rotor blade.

31. The method as recited in claim 30, wherein:

the step of providing at least one aperture on the rotor blade comprises an additional step of providing at least one aperture on the upper surface of the rotor blade; and the second activating step comprises a step of pushing air out of and drawing air into the at least one aperture on the upper surface of the rotor blade, to thereby increase a lift of the rotor blade.

* * * * *